United States Patent
Hosatte et al.

(12)

(10) Patent No.: US 6,228,506 B1
(45) Date of Patent: *May 8, 2001

(54) CELLULOSE/POLYMER COMPOSITE ENTHALPY EXCHANGER AND METHOD FOR ITS MANUFACTURE

(75) Inventors: Sophie Hosatte, Sanite-Julie; Mouloud Amazouz, Longueil; Roland Côté, Laval, all of (CA)

(73) Assignee: Natural Resources Canada, Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,410

(22) Filed: Mar. 16, 1998

(51) Int. Cl.[7] .............................. B32B 29/00; B05D 3/02; B01D 53/06

(52) U.S. Cl. .................. 428/537.5; 428/182; 428/507; 427/337; 427/372.2; 427/396; 96/125; 96/153; 96/154; 55/524

(58) Field of Search ............................ 428/182, 537.5, 428/532, 507; 442/118; 427/337, 372.2, 396; 55/524; 96/125, 150, 153, 154

(56) References Cited

U.S. PATENT DOCUMENTS

| | | | |
|---|---|---|---|
| 3,005,456 | 10/1961 | Graham, Jr. | 128/285 |
| 3,338,034 | 8/1967 | Hemstreet | 55/269 |
| 3,669,103 | 6/1972 | Harper et al. | 128/156 |
| 3,810,468 | 5/1974 | Harper et al. | 128/156 |
| 3,980,663 | 9/1976 | Gross | 260/29.6 |
| 4,093,776 | 6/1978 | Aoki et al. | 428/402 |
| 4,117,184 | 9/1978 | Erickson et al. | 428/224 |
| 4,128,692 | 12/1978 | Reid | 428/378 |
| 4,148,949 | 4/1979 | Casper et al. | 427/391 |
| 4,172,164 | 10/1979 | Meyer et al. | 428/72 |
| 4,255,171 | 3/1981 | Dravnieks | 55/269 |
| 4,354,487 | 10/1982 | Oczkowski et al. | 128/156 |
| 4,594,860 | 6/1986 | Coellner et al. | 62/271 |
| 4,605,401 | 8/1986 | Chmelir et al. | 604/368 |
| 4,748,076 | 5/1988 | Saotome | 428/224 |
| 4,769,053 | 9/1988 | Fischer, Jr. | 58/389 |
| 4,835,020 | 5/1989 | Itoh et al. | 427/389.9 |
| 4,842,927 | 6/1989 | Itoh et al. | 428/254 |
| 4,865,886 | 9/1989 | Itoh et al. | 427/342 |
| 4,875,520 | 10/1989 | Steele et al. | 165/10 |
| 4,888,238 | 12/1989 | Katz et al. | 428/378 |
| 4,948,659 | 8/1990 | Itoh et al. | 428/254 |
| 4,962,172 | 10/1990 | Allen et al. | 526/318.42 |
| 5,026,596 | 6/1991 | Saotome | 428/264 |
| 5,052,188 | 10/1991 | Komarneni | 62/94 |
| 5,071,681 | 12/1991 | Manning et al. | 427/392 |
| 5,191,771 | 3/1993 | Meckler | 62/271 |
| 5,350,443 | 9/1994 | von Blücher | 96/135 |
| 5,447,727 | 9/1995 | Graham | 424/487 |
| 5,453,323 | 9/1995 | Chambers et al. | 428/402 |
| 5,496,397 | 3/1996 | Fischer et al. | 96/154 |
| 5,505,370 | 4/1996 | Brown et al. | 229/120.011 |
| 5,505,769 | 4/1996 | Dinnage et al. | 96/153 |
| 5,534,304 | 7/1996 | Geursen et al. | 427/389.9 |
| 5,542,968 | 8/1996 | Belding et al. | 96/125 |

FOREIGN PATENT DOCUMENTS 1285931    7/1991 (CA).

OTHER PUBLICATIONS

Alger, M., Polymer Science Dictionary, 2nd Edition London, Chapman & Hall, p. 3, QD480.3,A52, 1997.*
Patent Abstracts of Japan, vol. 005, No. 083 (M–071), May 30, 1981 & JP 56 030595 A (Mitsubishi Electric Corp.), Mar. 27, 1981.
Patent Abstracts of Japan, vol. 005, No. 010 (M–051, Jan. 22, 1981 & JP 55 140097 A (Mitsubishi Electric Corp.), Nov. 1, 1980.

* cited by examiner

Primary Examiner—Donald J. Loney
(74) Attorney, Agent, or Firm—Jones, Tullar & Cooper

(57) ABSTRACT

The invention relates to a composite enthalpy exchanger useful for transferring or removing latent and sensible heat from a gaseous stream. This enthalpy exchanger consists of a cellulose-based substrate impregnated with a polymeric desiccant. Also provided is a method of manufacture of the enthalpy exchanger wherein the process for synthesizing the polymer on the substrate is disclosed.

20 Claims, No Drawings

CELLULOSE/POLYMER COMPOSITE ENTHALPY EXCHANGER AND METHOD FOR ITS MANUFACTURE

FIELD OF THE INVENTION

The invention relates to a new sensible and latent heat exchange device, hereinafter termed an enthalpy exchanger, and to a method for its manufacture. This enthalpy exchanger consists of a cellulose-based substrate impregnated with a polymeric desiccant. This device has possible applications in the field of air treatment, such as dehumidification, in systems for the transfer of moisture and heat between two air streams, in HVAC systems and in other applications involving water vapour control and recovery.

BACKGROUND

The solid desiccants used in air treatment systems or other applications are primarily inorganic (silica gel, molecular sieves, etc). They take the form of fine powders which must be bonded to a rigid substrate. There are a number of techniques for depositing these desiccants, some of which have been patented. Examples include patents filed in the United States under U.S. Pat. No. 3,338,034; 4,769,053; 5,052,188; 5,120,694; and 5,496,397. U.S. Pat. No. 5,542, 968 describes a method which involves mixing the desiccant powder with fibres in a solution containing a binder and fire retardants, among other ingredients. A manufacturing process borrowed from the paper industry is then used to produce sheets of this compound.

Another technique disclosed in Canadian Patent No. 1,285,931 involves coating a metallic substrate with a mixture consisting primarily of an inorganic desiccant and a heat-curable binder or adhesive in a solvent. The powder is then bonded to the substrate by heating the article. U.S. Pat. No. 4,172,164 describes the use of a solvent to dissolve the surface of the thermoplastic substrate, leaving the polymer particles imbedded in it following evaporation of the solvent. These techniques have the disadvantage of inhibiting to some extent the absorption of water by the desiccant powder, which may deliquesce and become detached under conditions of actual use.

SUMMARY OF THE INVENTION

The technique presented here involves the production of an enthalpy exchanger consisting of a cellulose substrate coated with a polymerized desiccant. Polymer-based desiccants have the advantage of being readily modified to obtain the desired absorptive properties, as well as other properties of interest for certain applications. The polymers themselves have relatively good thermal transfer properties thereby enabling sensible heat transfer. They can also be obtained in a number of geometric forms. Some have a certain affinity for structural products used as substrates, which can facilitate bonding.

The product developed consists, preferably, of a potassium salt of acrylic acid polymerized on a corrugated cardboard substrate. The technique used to bond the desiccant to the substrate does not alter the properties of the desiccant, even when the proportion of polymer by mass is relatively low. In addition, the article has good fire resistance and acceptable mechanical strength.

In this application, applicants are also seeking a high rate of absorption and desorption, so that the article reacts rapidly to a sudden variation in the concentration of water vapour or other gases in the flow of air in contact with the desiccant. Deposition of the polymer in a thin layer on the walls of the substrate makes it possible to obtain very rapid sorption kinetics.

In general, the technique consists of preparing a solution with a base of acrylic, methacrylic or itaconic acid or a mixture thereof. The monomer is mixed with a sufficient quantity of a homolytic reaction initiator such as a peroxide, azabisisobutyronitrile or other initiator, in water, acetone and/or other solvents. A cross-polymerization agent such as trimethylolpropane triacrylate, divinylbenzene or other cross-polymerization agent is added to the solution in a quantity corresponding to the desired density of cross-linkages to be obtained in the polymer. The solution is well mixed, then applied evenly to the cellulose-based exchanger. Cellulose has been selected because of its chemical affinity for polymer. The article, impregnated with the solution, is placed in a chamber with low oxygen and heated to a temperature of between 50° C. and 80° C. The polymerization reaction thus initiated should be completed within a few minutes, depending on the rate of thermal exchange in the chamber. Once the polymerized solution is bonded to the substrate, the polymer is placed in contact with a hydroxide solution of sodium, potassium, lithium or other monovalent or bivalent cations. The polymer is transformed into a salt. The substrate and desiccant are then dried to form a rigid article.

When the desiccant absorbs water vapour or other products, its volume increases. In certain applications, the swelling may be excessive and must be controlled or minimized. This can be done by simply adjusting the proportions of the products used in the composition of the polymer, such as the cross-polymerization agent. The swelling of the polymer is, in fact, related to the degree of cross-linkage.

The concentration of the base monomer in the solution can be adjusted on the basis of the desired proportion of desiccant by mass to be obtained. Generally, the amount of polymer present in the article or substrate is from about 5 to 65% by mass, and preferably from about 15 to 30% by mass.

The enthalpy exchanger contains passageways which allow the air to circulate and to come into contact with the substrate walls and the desiccant. The enthalpy exchanger permits exchanges of sensible heat and moisture with an air stream. It may be a rotary or static type with parallel or cross streams. The first case involves wall-to-air exchanges of sensible and latent heat while, in the second, heat and moisture pass through the wall of the exchanger for transfer from one air stream to another.

The enthalpy exchanger of the present invention can be manufactured by either of two techniques. The first consists of constructing the exchanger in its final form and impregnating it with the monomer solution, which is then polymerized. The exchanger can be constructed by rolling the substrate to form a wheel, or by stacking the substrate to produce a static exchanger with cross or parallel streams. The substrate may consist of corrugated cardboard, corrugated paper or any other cellulose-fibre-based product. The second technique involves impregnating a continuous flat sheet of cellulose-based substrate with the monomer solution, which is then polymerized. The composite sheet thus obtained is corrugated before drying to obtain the desired passageway geometry, then rolled to form a wheel, for example.

The technique used to bond the desiccant to the substrate does not affect the desiccant's absorptive properties. This process does not alter the desiccant's absorptive properties. In addition, it gives the substrate a number of other interesting properties, including mechanical rigidity and fire resistance. Due to the thermal properties of the polymer, the desiccant article is also capable of transferring heat from a warm air (gas) stream to a cool air (gas) stream within a recovery system. The bond obtained between the desiccant and the substrate is very strong and permits it to withstand a large number of absorption and desorption cycles without any deterioration in absorptive properties of physical characteristics. A further advantage of this technique is the fact that these properties can be controlled by adjusting the composition and quantity of polymer. Most supports made from natural or synthetic cellulose fibres are permeable to air, which can pose a contamination problem in certain application such as air exchangers. Treatment of this type of support with the polymer makes it much more air-tight and also more rigid, even using amounts of the polymer on the order of only 10%. For an application in the field of total heat exchangers made from paper or cardboard, a quantity of polymer on the order of 15% to 20% of total mass has been found to result in a product with very good sorption capacity and kinetics, good mechanical resistance as well as very good fire resistance (non-flammability). Furthermore, it is believed that the product has bactericidal properties and that it transfers virtually none of the contaminants present in the air. These last two properties are particularly important for applications in the domestic sector.

Cellulosic-based substrates are desirable due to their chemical affinity for polymer and their low cost. Preferably, the support is made from corrugated cardboard or paper due to the high quality/price ratio. However, other types of substrate made from natural or synthetic fibres, woven or non-woven, can be used. The polymer has also been successfully deposited on silica-gel powder in order to fix it by some other technique, such as gluing on to substrates made of metal or plastic material. Other inorganic powders (talc, etc.) or organic powders (skeletons of micro-organisms, etc.) can also be used.

The monomer solution consists primarily of a member of the carboxylic acid family such as acrylic acid or methacrylic acid, a homolytic reaction initiator such as peroxide, and a cross-polymerization agent such as trimethylolpropane triacrylate. The mixture is soluble in water and/or a solvent such as acetone.

Following impregnation with the solution, the substrate is heated in a chamber with very low oxygen to a temperature of between 50° C. (122° F.) and 80° C. (176° F.).

The acidic polymer is then placed in contact with an alkaline solution of sodium, potassium or other hydroxide, to transform it into a salt of these cations. This operation gives the polymer, and thus the enthalpy exchanger, its absorptive properties.

DETAILED DESCRIPTION OF THE INVENTION

The process of applying the polymeric desiccant material to the cellulosic substrate as either a stock material or as a pre-constructed article made from a cellulosic substrate is generally carried out in the same manner. The process consists of preparing a monomer solution with a base of acrylic, methacrylic or itaconic acid or a mixture thereof. The concentration of the base monomer in the solution can be adjusted on the basis of the desired proportion of desiccant by mass to be obtained. In the preferred embodiment, acrylic acid is used. The quantity of acrylic acid should be between 2.5 M and 4.0 M; at less than 2.5 M, the gel obtained will be insufficiently rigid, and above 4.0 M, there is a risk of the reaction being too violent (exothermic) and thus difficult to control. Between 20% and 90% of the carboxyl groups must be neutralized by the addition of potassium hydroxide (KOH) or another base. Preferably, 50% of the carboxyl groups must be neutralized by adding a solution of KOH dissolved in water. The total quantity of water in the final solution must not exceed 35% of the overall volume. A greater volume of water would risk destroying the structure of the cellulosic fibre support and would limit the maximum quantity of dissolved cross-polymerizing agent.

The monomer is then mixed with a sufficient quantity of homolytic reaction inhibitor such as a peroxide, azabisisobutyronitrile or other initiator, in water, acetone and/or other solvents. Other possible choices of initiator include a peroxide such as sodium, ammonium or potassium persulphate, a hydroxyperoxide such as cumene hydroxyperoxide or an alkyl peroxide such as di-tert-butylperoxide. Peroxide is preferred because of its non-toxicity and low cost. The amount of reaction-initiating agent must be sufficient to start the reaction, that is, about 1% of the total solution volume, although an excess of this substance would have no impact on the polymerized product.

A cross-polymerization agent such as trimethylolpropane triacrylate, trimethylolpropane propane ethoxylate triacrylate, divinyl benzene or other cross-polymerization agent is added to the solution in a quantity corresponding to the desired density of cross-linkages to be obtained in the polymer. To obtain an article capable of absorbing enough water vapour without excessive swelling, it is necessary to use 0.1% to 2.0% by volume of a cross-polymerizing agent, preferably trimethylolpropane triacrylate. Trimethylolpropane triacrylate is preferred because of its cost. A proportion on the order of 1% of total volume has been found to produce the best compromise for the desired properties in an enthalpy exchanger. The increase in volume (or swelling) of the desiccant material as a result of the absorption of water vapour can be controlled by the proportion of cross-polymerization agent used to synthesize the polymer.

A quantity of organic solvents (acetone, for example) must be added to bring about complete solution. Other solvents may be used or mixed with the acetone. In order to minimize loss of acrylic acid during the heating phase, it is possible to use propylene glycol, ethylene glycol or other solvents compatible with acetone and having a high boiling point.

The solution is well mixed, the applied evenly to the cellulose-based substrate or the pre-constructed article. The article, impregnated with the solution, is placed in a closed chamber containing minimum oxygen and heated to a temperature sufficient to initiated polymerization. The polymerization reaction thus initiated should be completed within a few minutes, depending on the rate of thermal exchange in the chamber. Since polymerization is a radical reaction which is blocked in the presence of oxygen, it is therefore preferable to minimize the amount of oxygen in the solution in order to avoid the formation of short-chain molecules or a poor polymerization yield. The presence of minute quantities of oxygen should have no perceptible effect on the quality of polymerization. In practice, purging with a flow of nitrogen or argon is usually sufficient to displace any oxygen dissolved in the solution or present in the dead space around the article.

Heating temperature must be sufficient to initiate polymerization, but must not lead to excessive evaporation of the acrylic acid. A temperature of 80° C. to 120° C. is suggested. Preferably, the heating equipment will be sufficiently powerful to minimize the heating time. High-frequency or microwave ovens are especially recommended, but a sufficiently powerful conventional oven can be used effectively and can reduce manufacturing costs.

The extent of cross-linkage is fixed by the amount of cross-polymerizing agent which has actually reacted during the polymerization. To that end, it is important to ensure that it is uniformly and completely dissolved in the monomer solution. In the present case, where the preferred agent is trimethylolpropane triacrylate which has limited aqueous solubility, it is necessary to use organic solvents such as acetone, propylene glycol as well as other compatible solvents. The organic solvents promote improved solubility of the cross-polymerizing agent, which makes it possible to obtain a polymeric gel with a three-dimensional structure. It is preferable to limit the volume of water to 35% of the total volume of monomer solution.

Once the polymerized solution is bonded to the substrate, the polymer is placed in contact with a hydroxide solution of sodium, potassium, lithium, ammonium or other monovalent or bivalent cations. The polymer is transformed into a salt of the cation corresponding to the alkaline solution used to give the polymer its absorptive properties. In the preferred embodiment, the acrylic acid based polymer is converted to a polyacrylic acid salt by wetting the article with a solution of potassium hydroxide or sodium hydroxide dissolved in methanol. Potassium hydroxide is preferred as it gives the polymer better absorptive properties.

The treated article or substrate is then dried. In the case of the polymerization treatment being applied to a substrate, the substrate is then used generally as stock material in the fabrication of the enthalpy exchanger's "working" components.

An illustration of the principles of the present invention is provided by way of the following example.

EXAMPLE

An enthalpy-exchange wheel containing 20% by mass of the polymer obtained by starting with a solution of 2.5 M of acrylic acid in 250 ml of aqueous KOH, with 1% by volume of trimethylolpropane triacrylate, 1% by volume of peroxide and the rest acetone by volume, has the absorption capacities of 30%, 40% and 95% in the presence of a flow of air with a relative humidity of 30%, 60% and 90%, respectively. The wheel exhibits a high rate of absorption and desorption and reacts rapidly to a sudden variation in the concentration of water vapour or other gases in the flow or air in contact therewith. Tests carried out with full-size enthalpy exchangers showed that the polymer has very good sorption kinetics for water vapour, even under extreme conditions of use.

It will be understood from the foregoing that the example and embodiments referred to herein are intended to be illustrative of the principles of the invention and should not be construed as limiting. Those skilled in the art will appreciate that various modifications and/or substitutions in both the materials and the process can be effected without departing from the spirit and scope of the invention as defined in the appended claims.

We claim:

1. An enthalpy exchanger comprising a cellulosic fibre-based substrate treated with a polymeric desiccant, wherein the polymeric desiccant is obtained by preparing a polymerizable organic solution containing (a) a polymerizable monomer selected from the groups consisting of acrylic acid, methacrylic acid and itaconic acid wherein up to 50% of the carboxyl groups are neutralized by treatment with a base, (b) a homolytic reaction initiator, (c) at least 0.1% by weight a cross-polymerization agent and (d) an organic solvent, said polymerizable solution containing less than about 35% by weight of water, impregnating said cellulosic substrate with said polymerizable solution, heating said impregnated substrate in a substantially oxygen-free environment to effect polymerization of the monomer on the substrate, treating the substrate thus obtained with an alkaline solution to transform the polymer into a salt and drying the alkaline treated substrate.

2. An enthalpy exchanger of claim 1,
wherein the polymeric desiccant treated substrate is a cardboard or paper substrate formed as a rotary enthalpy wheel.

3. An enthalpy exchanger of claim 1,
wherein the polymeric desiccant treated substrate comprises cardboard or paper substrates forms as a static enthalpy exchanger.

4. A process for making an enthalpy exchanger of a predetermined structure comprising cardboard or paper sheets which are either rolled around a hub to form a multi-layer wheel with transverse passageways or are stacked to form a multi-layer structure having transverse passageways, the process comprising the steps of:

(a) preparing a polymerizable organic solution containing a polymerizable monomer selected from the group consisting of acrylic acid, methacrylic acid and itaconic acid in which up to 50% of the carboxyl groups are neutralized by treatment with a base, a homolytic reaction initiator, at least 0.1% by weight of a cross-polymerization agent and an organic solvent, said polymerizable organic solution containing less than 35% by weight of water;

(b) impregnating said cardboard or paper sheets with the solution defined in (a);

(c) heating the impregnated sheets in a substantially oxygen-free atmosphere to initiate polymerization of the monomer;

(d) treating the polymerized sheets in an alkaline solution to transform the polymer into a salt; and (e) drying the sheets to form the enthalpy exchanger.

5. The process of claim 4, wherein the cardboard or paper sheets are in corrugated form.

6. The process of claim 5, wherein the cardboard or paper sheets are impregnated before being formed into a multi-layer wheel or multi-layer stack.

7. The process of claim 5, wherein the cardboard or paper sheets are impregnated after being formed into a multi-layer wheel or multi-layer stack.

8. The process of claim 4, wherein the sheets being impregnated are paper sheets which are impregnated with said polymerizable organic solution and polymerized in the form of flat sheets and then corrugated prior to drying.

9. The process of claim 5, wherein the monomer is acrylic acid which is present in the solution in a concentration between 2.5 M to 4.0 M.

10. The process of claim 8, wherein the homolytic reaction initiator is peroxide, sodium persulphate or azabisisobutyronitrile.

11. The process of claim 5, wherein the amount of cross-polymerization agent in the solution is between 0.1–2% by weight.

12. The process of claim 5, wherein the organic solvent is acetone or a glycol.

13. The process of claim 5, wherein the cross-polymerization agent is trimethylolpropane triacrylate.

14. The process of claim 11, wherein the amount of cross-polymerization agent in the solution is between 1–2% by weight of the amount of acrylic acid.

15. The process of claim 5, wherein the polymerizable organic solution is trimethylolpropane ethoxylate triacrylate or divinyl benzene.

16. The process of claim 5, wherein the polymerizable organic solution is heated to a temperature of from 60° C. (140° F.) to 80° C. (176° F.) to initiate polymerization.

17. The process of claim 5, wherein the alkaline solution contains a monovalent cation of potassium, sodium, lithium or ammonium.

18. The process of claim 5, wherein the alkaline solution contains potassium hydroxide or sodium hydroxide dissolved in methanol.

19. The process of claim 5, wherein about 20–50% of the carboxyl groups in the monomer are neutralized.

20. An enthalpy exchanger of a predetermined structure comprising cardboard or paper sheets which are either rolled around a hub to form a multi-layer wheel with transverse passageways or are stacked to form a multi-layer structure having transverse passageways, made by the process of claim 4.

* * * * *